(12) United States Patent
Metzger et al.

(10) Patent No.: US 7,771,761 B2
(45) Date of Patent: *Aug. 10, 2010

(54) CHEESE WITH CALCIUM LACTATE CRYSTAL INHIBITOR

(75) Inventors: Lloyd E. Metzger, Champlin, MN (US); Donald A. Grindstaff, Apple Valley, MN (US)

(73) Assignees: Regents of The University of Minnesota, Minneapolis, MN (US); Nutricepts, Inc., Burnsville, MN (US)

( * ) Notice: Subject to any disclaimer, the term of this patent is extended or adjusted under 35 U.S.C. 154(b) by 922 days.

This patent is subject to a terminal disclaimer.

(21) Appl. No.: 11/500,176

(22) Filed: Aug. 7, 2006

(65) Prior Publication Data

US 2007/0031567 A1 Feb. 8, 2007

Related U.S. Application Data

(63) Continuation-in-part of application No. 11/197,956, filed on Aug. 5, 2005, now Pat. No. 7,625,589.

(60) Provisional application No. 60/705,864, filed on Aug. 5, 2005.

(51) Int. Cl.
A23C 9/12 (2006.01)
A23C 19/00 (2006.01)

(52) U.S. Cl. .............................. 426/36; 426/38; 426/39; 426/582

(58) Field of Classification Search .................... 426/34, 426/36, 38, 39, 40, 580, 582, 654
See application file for complete search history.

(56) References Cited

U.S. PATENT DOCUMENTS

| | | | | |
|---|---|---|---|---|
| 1,708,099 | A | * | 4/1929 | Kernen ........................ 426/36 |
| 1,890,948 | A | * | 12/1932 | Pasternack et al. ........... 426/582 |
| 2,011,074 | A | * | 8/1935 | Pasternack et al. ........... 426/334 |
| 2,065,183 | A | * | 12/1936 | Harris ........................ 426/582 |
| 2,494,636 | A | * | 1/1950 | Stine ........................... 426/36 |
| 5,186,965 | A | | 2/1993 | Fox et al. |
| 5,397,589 | A | | 3/1995 | Korte et al. |
| 5,478,590 | A | | 12/1995 | Merkenich et al. |
| 6,113,953 | A | | 9/2000 | McMahon et al. |
| 6,326,038 | B1 | | 12/2001 | Brafford |
| 6,500,463 | B1 | | 12/2002 | van Lengerich |
| 6,814,995 | B1 | | 11/2004 | Sotoyama et al. |
| 6,916,496 | B2 | | 7/2005 | Koka et al. |

OTHER PUBLICATIONS

Swearingen et al., Factors Affecting Calcium Lactate and Liquid Expulsion Defects In Cheddar Cheese, Journal of Dairy Science, 2004, 87:574-582, American Dairy Science Assoc.
Kubantseva et al., Factors Affecting Solubility of Calcium Lactate in Aqueous Solutions, Journal of Dairy Science, 2004, 87:863-867, American Dairy Science Association.
Acharya et al., Comparison of Effect of Vacuum-Condensed and Ultrafiltered Milk on Cheddar Cheese, Journal of Dairy Science, 2004, 87:4004-4012, American Dairy Science Assoc.
PMP Fermentation Products, Inc., Gluconate Handbook, pp. 1-47.
Wei, A Clear Choice: Calcium Salts for Juices & Bottled Water, Food & Beverage Asia, Oct. 2003, 44-45.
PL Thomas & Company, Magnesium & Calcuim in your Beverage?, PLT Press, Summer 2003, Morristown, NJ.
Gerstner, Calcium Lactate Gluconate—the innovative solution for extra calcium, Jungbunzlauer—What's up.
Nair et al. "Reduction of Salt (NaCl) Losses During the Manufacture of Cheddar Cheese", J. Dairy Sci. 2004, vol. 87, p. 2831-2838.
Visser, "Proteolytic Enzymes and Their Relation to Cheese Ripening and Flavor: An Overview", J. Diary Sci. 1993, vol. 76, p. 329-350.
Mistry et al., "Influence of Salt on the Quality of Reduced Fat Cheddar Cheese", J. Dairy Sci. 1998, vol. 81, p. 1214-1221.
Johnson et al., "Effect of Packaging and Storage Conditions on Calcium Lactate Crystallization on the Surface of Cheddar Cheese", J. Dairy Sci. 1990, vol. 73, p. 3033-3041.

* cited by examiner

*Primary Examiner*—Leslie Wong
(74) *Attorney, Agent, or Firm*—Shewchuk IP Services, LLC; Jeffrey D. Shewchuk

(57) ABSTRACT

A calcium lactate crystal inhibitor is added to the typical cheese-making recipe to inhibit the growth of calcium lactate crystals as the cheese ages. The calcium lactate crystal inhibitor is preferably a sodium salt of an organic acid, and is preferably added with sodium chloride or shortly after sodium chloride as part of the salting step. The calcium lactate crystal inhibitor can be identified in a solubility model as being effective in preventing calcium lactate crystal formation by having no or essentially no visually observable crystals and a minimal reduction (less than 5.0%, and more preferably less than 1.0%) in the calcium and lactate content of a calcium L-lactate pentahydrate solubility solution after 14 days of storage at 7° C. The amount of calcium lactate crystal inhibitor salt is within the range of greater than zero to 10% of the weight of the curd, to result in a cheese having 0.26 to 2.8% calcium lactate crystal inhibitor in a cheddar cheese. The amount of calcium lactate crystal inhibitor salt added for other cheeses can be based upon the lactate content and salt retention of the cheese.

16 Claims, No Drawings

CHEESE WITH CALCIUM LACTATE CRYSTAL INHIBITOR

CROSS-REFERENCE TO RELATED APPLICATION(S)

This application claims priority from provisional application No. 60/705,864, filed Aug. 5, 2005, now U.S. Pat. No. 7,625,589. This application is also a continuation-in-part of application Ser. No. 11/197,956, filed Aug. 5, 2005, the disclosure of which is incorporated by reference.

BACKGROUND OF THE INVENTION

The present invention relates to the making of cheese, and particularly to the making of cheese ripened for two or more months such as Cheddar and Colby cheese.

Milk from many different mammals is used to make cheese, though cow's milk is the most common milk for cheese. Generally, cheese is made by developing acidity in milk and setting the milk with a clotting agent, such as rennet. The set milk is cut and whey is separated from the resulting curd. The curd may be pressed to provide a cheese block. The cheese-making process is essentially a concentration process that captures a portion of the protein, minerals, fat, water, and other minor components present in the original milk component. Rennet-based cheeses include cheeses such as mozzarella, Cheddar, Swiss, and Colby cheese. In a typical Cheddar cheese, the concentration factor is about ten times, i.e., approximately 10 lbs of natural Cheddar cheese are produced from 100 lbs of milk, with the remaining (90 lbs or so per 100 lbs milk) of material removed in the whey byproduct. Typical Cheddar cheese has 1.4 g lactate per 100 g and contains 37.5% water.

Curing typically takes place over a lengthy period of time under controlled conditions. Cheddar cheese, for example, is cured for a period of at least four months and may be cured for a period in excess of one year to obtain the full flavor desired in cheddar cheese.

In contrast to the natural cheese-making process, process cheese is not manufactured directly from milk and process cheese manufacture does not produce any byproducts. Process cheese is produced by combining natural cheese, other dairy based ingredients, water and emulsifying salts into a blend that is subsequently heated (typically to at least 65.5° C. for not less than 30 seconds, see 21 C.F.R. 133.169) and mixed to produce a homogeneous product.

Recently, use of concentrated milk as the base ingredient for making cheese has become more popular. Milk can be concentrated prior to cheese making using a variety of techniques including ultra-filtration, micro-filtration, vacuum condensation, or the addition of dry milk solids such as nonfat dry milk. The use of concentrated milk provides increased efficiency to the cheese-making process. Use of concentrated milk also reduces the amount of whey produced for a given amount of cheese, facilitates standardization of formulation and production, and promotes more consistent quality and yields of the resultant cheese. The use of concentrated milk thus lowers cost and processing times for making cheese, particularly beneficial for semi-continuous cheese manufacturing processes such as utilized in typical large-scale cheese plants. The semi-continuous cheese manufacturing includes numerous cheese vats that sequentially feed a draining/conveying belt and a salting belt. This semicontinuous cheese making system requires consistent and rapid production of acid by starter cultures used in the cheese manufacturing process. The efficiency of semi-continuous cheese manufacturing is substantially improved if the milk is concentrated prior to cheese-making.

During the aging process, calcium lactate crystals can grow within and on the surface of cheese. These crystals are small white spots that can be seen, often without magnification, upon close inspection of the cheese. The crystals are not present in the cheese immediately after manufacture, but typically start to appear between two and six months of aging. While the calcium lactate crystals are not harmful to consumers, they can be perceived in mouthfeel as adding a slight amount of grittiness to the cheese. More importantly for affecting cheese sales, consumers often believe the crystals are mold. The growth of calcium lactate crystals is thus viewed as a defect representing substantial financial loss for cheese manufacturers.

For reasons that are not entirely clear, the use of concentrated milk and a semi-continuous cheese making process in making an aged cheese seems to worsen the calcium lactate crystal problem. Consequently cheese manufacturers have an unenviable choice: they can either use a less efficient cheese-making process or they can use a more efficient manufacturing process that more likely results in calcium lactate crystals defects.

Factors influencing the formation of calcium lactate crystals have been extensively studied. Concentrations of calcium and lactate ions existing in cheese serum are very close to saturation, and small increases in the concentration of either component could result in super saturation and crystallization. It has also been theorized that milk citrate levels and the subsequent utilization of citrate by microorganisms may play a role in calcium lactate formation. Curd washing, curing, and storage temperature may further contribute to calcium lactate crystal formation. Other studies report that calcium lactate is formed when L (+)-lactate is converted into a racemic mixture of L(+)- and D(−)-lactate, the latter being much more prone to crystallization. The conversion of L(+)-lactate to D(−)-lactate is thought to be carried out by certain strains of bacteria.

Prior art methods for limiting calcium lactate crystal formation in cheese include: 1) reducing the concentration of lactic acid in the final curd, 2) reducing or eliminating undesirable non-starter lactic acid bacteria ("NSLAB") from the cheese-making process, 3) controlling storage temperature, and 4) vacuum packaging cheese to minimize the airspace around the outer cheese surface. The use of certain starter culture strains may also increase or decrease the presence of calcium lactate crystals, due to post manufacture fermentation by the selected starter culture.

Although progress has been made in developing strategies for prevention of calcium lactate crystals, the defect is still prevalent. Better methods of minimizing calcium lactate crystal formation in aged cheeses are needed.

BRIEF SUMMARY OF THE INVENTION

The present invention is a method of adding one or more ingredients to the typical cheese-making recipe to inhibit the growth of calcium lactate crystals as the cheese ages, and the cheese composition made by such a method and recipe. The preferred method of adding the calcium lactate crystal inhibitor is during the salting stage of the cheese-making process, and the calcium lactate crystal inhibitor may be provided in a salt carrier. The preferred added calcium lactate crystal inhibitor is gluconate provided by sodium gluconate, but other ingredients such as the sodium salts of organic acids sodium malate and sodium lactobionate and similar ingredients, are also beneficial. A method for modeling the beneficial prospects of the calcium lactate crystal inhibitor includes observing crystal formation on sand paper after storage in a calcium lactate solution containing the calcium lactate crystal inhibitor and performing calcium and lactate analyses on such stored solutions.

DETAILED DESCRIPTION

The present invention modifies conventional cheese-making and begins, as all cheeses do, with milk. Preferably the milk is whole cow's milk having 3 to 4% butterfat and in excess of 7% solids non-fat. However, it is believed that cheeses formed from milk of other mammals will similarly benefit from the present invention, as will cheeses formed from milks with different fat (including non-fat) and/or different solids non-fat concentrations.

The preferred milk starting ingredient is preferably concentrated to achieve efficiencies in the cheese-making process. Preferably the solids content of the milk is increased to have total solids within the range of 13 to 50%, more preferably within the range of 13 to 18%, and most preferably to have total solids within the range of 14 to 15%. While the concentrated milk could be formed merely by adding condensed skim milk, ultrafiltered skim milk, microfiltered skim milk or non-fat dry milk solids to the starting milk, more preferably the concentrated milk includes an addition of fat as well as non-fat milk solids. The preferred concentrated milk may thus be formed by adding various amounts of condensed skim milk, ultrafiltered skim milk, microfiltered skim milk or non-fat dry milk solids and cream to whole milk, thereby retaining the ratio of casein to fat present in whole milk. Calcium chloride may be added to the milk ingredient to generate firmer curds. Fortifying ingredients or colorings may also be added to the milk ingredient.

The milk ingredient is acidified. If desired, the acidification can be achieved by adding an acidic ingredient, such as citric acid or tartaric acid, or through natural bacterial acidification. More preferably, the acidification is achieved by adding a starter culture, such as a mesophilic (lactococcus lactis ssp cremoris), thermophilic (streptococcus thermophilus) or helvetic (lactobacillus helveticus) bacteria culture. Most preferably (for Cheddar cheese) a mesophilic starter culture is used. If a starter culture is used, the mixture is then incubated between about 10 and 60 minutes, preferably about 30 minutes at a temperature between about 30 and 37° C., preferably about 31 to about 32° C.

After acidification, a coagulating agent, preferably rennet at about 0.02 to about 0.1 percent, is added to act on the casein and cause the milk ingredient to coagulate. The rennet may be animal, microbial or vegetable. The mixture is further incubated between about 10 and 60 minutes, preferably about 30 minutes, at a temperature between about 30 and 370° C., preferably about 31 to about 32° C. The addition of a coagulating agent, preferably rennet, causes the milk to coagulate into a mass.

After coagulation, the mass is cut, stirred, and heated (i.e., from about 30 to about 42° C. and preferably from about 31 to about 39° C.) for between about 10 and about 60 minutes, preferably about 30 minutes. The whey is drained off and the curd is matted into a cohesive mass in the traditional Cheddaring process or is intermittently stirred when using the stirred curd process. Subsequently in the traditional Cheddar process the mass is cut into pieces and salted, whereas in the stirred curd process the curd is simply salted. About 1 to about 4% salt, and preferably about 1.5 to about 3% salt is added to the curd. The preferred salt is sodium chloride added most preferably (for a Cheddar cheese) at about 2.75%. The salted curd is stirred, further drained and pressed into forms. Approximately 65-90% of the salt added is retained in the cheese, and thus consequently a typical Cheddar cheese has 1.5 to 2.0% salt. The cheese is then aged for a time period in excess of one week, preferably from one month to one year, and most preferably about 4 months prior to consumption.

Within this conventional cheese-making process, a calcium lactate crystal inhibitor ("CLC inhibitor") is added. The CLC inhibitor decreases the growth of calcium lactate crystals in cheese, such that the volume of calcium lactate crystals after two months or more aging time is reduced by at least 50%. The preferred CLC inhibitor is gluconate. Alternative preferred CLC inhibitors include: malate, acetate, citrate, succinate, propinate, galactonate, and lactobionate. Polyphosphate might also work as a CLC inhibitor, such as provided in sodium polyphosphate. Salts of organic acids with a lower molecular weight like gluconate ($C_6H_{11}O_7$; MW=195) and malate ($C_4H_4O_5$; MW=132) are preferred over higher molecular weight organic acids like lactobionate ($C_{12}H_{22}O_{12}$; MW=358). This is the case because for a larger molecular weight, a larger amount of the salt of the organic acid is required to have the same molar concentration. Consequently a larger amount of sodium lactobionate would be required as compared to sodium gluconate or sodium malate to be an effective calcium lactate inhibitor.

The beneficial results of the present invention are believed to be primarily achieved by increasing the solubility of calcium, lactate and/or calcium lactate in the water component of the resultant cheese, which is believed to occur through the formation of metastable complexes with the CLC inhibitor and one or both of calcium and lactate. As used herein, the term "metastable complex" means that the compound is a mixture of various crystalline and non-crystalline forms and solid solutions of the CLC inhibitor ions and one or both of calcium ions and lactate ions, as well as salts of these ions, which does not reach final equilibrium in the cheese over an aging time period in excess of two weeks. The metastable complexes appear to have combinations of crystalline and amorphous states. The CLC inhibitor appears to form metastable complexes which effectively remove one or both of the calcium and lactate ions from being available for the formation of calcium lactate crystals within the cheese during the aging process. The preferred CLC inhibitor is added in an effective amount to increase the solubility of lactate by at least 1 g/100 g water when calcium is also present at a concentration of at least 1.06%, taken at cheese aging temperature. For instance, cheddar cheese is aged under refrigeration, so the CLC inhibitor increases the solubility of lactate in water by at least 1 g/100 water at 4° C. More preferably, the CLC inhibitor is added in an effective amount to increase the solubility of lactate in water by at least 2.76 g/100 g water, thereby at least doubling the solubility of lactate in water when calcium is also present. Most preferably, the CLC inhibitor provides nearly a four fold increase in the solubility of lactate in water when calcium is also present.

The solubility of anhydrous calcium lactate has been report to be 3.38, 4.04, and 6.41 g of $CaLac_2$/100 g of water at 4, 10, and 24° C. respectively. Since cheese is often refrigerated during the aging process, the value at 4° C. of 3.38 g of anhydrous $CaLac_2$/100 g of water is viewed as most important for the present invention. The molar ratio of lactate in $CaLac_2$ is 81.6%, so 3.38 g of anhydrous $CaLac_2$/100 g of water provides 2.76 g of lactate/100 g of water and 0.62 g calcium/100 g of water. Thus, it is believed that calcium lactate crystals only form when greater than 2.76 g of lactate/100 g of water and 0.62 g of calcium/100 g of water are present in the cheese. Cheddar cheese contains approximately 0.70% calcium. A portion of this calcium is bound to the protein network present in the cheese, whereas a portion is soluble in the water phase of cheese and is called soluble calcium. This so called soluble calcium is available to interact with lactate and participate in the formation of calcium lactate crystals. After the first week of ripening Cheddar cheese has about 0.4 g of soluble calcium/100 g of cheese. As mentioned previously a typical Cheddar cheese has 37.5% water. Consequently the concentration of soluble calcium in the water portion of a typical Cheddar cheese is 1.06 g/100 g of water (0.4/37.5×100). Additionally, typical Cheddar cheese has 1.4 g lactate per 100 g and again contains 37.5% water. Consequently the concentration of lactate in the water portion of typical Cheddar cheese is 3.73 g per 100 g of water (1.4/37.5×100). Since 3.73 g lactate/100 g water and 0.06 g calcium/100 g water present in Cheddar cheese is larger than the 2.76 g of lactate/100 g water and 0.62 g calcium/100 g water that is required to exceed the solubility of 3.38 g of anhydrous $CaLac_2$/100 g at 4° C., it is no surprise that calcium lactate crystals are a major defect in many prior art cheddar cheeses.

The presence of gluconate, for instance, can increase the solubility of calcium lactate. This increase in solubility of calcium lactate is believed to be the result of metastable complexes formed between gluconate and one or both of calcium and lactate. In order to prevent the formation of calcium lactate crystals as a result of formation of metastable complexes, a molecule of gluconate must be present for each molecule of calcium or lactate in excess of the 3.38 g of anhydrous calcium lactate that is soluble in 100 g of water at 4° C. The concentration of 3.38 g of anhydrous calcium lactate/100 g water represents 0.127 moles of lactate and 0.028 moles of calcium. The typical concentration of 3.73 g of lactate/100 g of water in cheese represents 0.210 moles of lactate whereas the 1.06 g of calcium/100 g of water in cheese represents 0.265 moles of calcium. These calculations demonstrate that the molar concentration of calcium in excess of the molar concentration required for calcium lactate crystal formation (0.265-0.028=0.237) is larger than the molar concentration of lactate in excess of the molar concentration required for calcium lactate crystal formation (0.210-0.127=0.0834). Since the excess molar ration of lactate is smaller than the excess molar ratio of calcium it can be used to determine the concentration of the gluconate required to form metastable complexes between calcium lactate and gluconate that will prevent the formation of calcium lactate crystals. For example, as previously mentioned, in typical Cheddar cheese the excess molar concentration of lactate is 0.0834. Consequently the incorporation of 0.0834 moles of gluconate into the water portion of cheese is required. This corresponds to 0.619 g of gluconate/100 g of cheese.

If gluconate is used as the calcium lactate crystal inhibitor, the amount of gluconate should provide an amount of free gluconate which results in effective inhibiting of calcium lactate crystal growth. The preferred gluconate addition results in the inclusion of greater than zero to 5.8% gluconate in the final cheese products, and more preferably greater than zero to 4.5% gluconate in the final cheese product. Even more preferably, the gluconate is added to result in about 0.26 to 2.8% gluconate in the final cheese product, with the most preferred amount being 0.62% gluconate in the final cheese product.

The beneficial results of the present invention are believed to be secondarily achieved by a combination of additional factors. In particular, the preferred CLC inhibitors are believed to slow the bacterial production of additional lactic acid by the culture in the cheese. The preferred CLC inhibitors are also believed to affect the proteins within the cheese, causing the proteins to better bind water. The preferred cheeses in accordance with the present invention thus exhibit less weeping than without the addition of the CLC inhibitor. The preferred CLC inhibitors are also believed to result in a change in pH of the cheese during ripening. As an additional secondary benefit, the preferred CLC inhibitors are believed to suppress bitterness in the cheese. The cause and effect relationships and interrelatedness of these various secondary factors (reduced lactic acid production, better water binding in proteins, change pH curve during ripening, decreased bitterness) in relation to the formation of metastable complexes and changes in calcium, lactate and/or calcium lactate solubility is not known, but further study is being conducted.

The CLC inhibitor needs to be incorporated into the cheese during the manufacturing process, prior to aging. It could, for instance, be added to the starting milk ingredient, to the concentrated milk, to the starter culture or to the rennet. The preferred method for adding the CLC inhibitor, however, is during the salting step. This allows the use of a granulate form of the CLC inhibitor while minimizing the amount of the CLC inhibitor lost during whey separation, and without needlessly increasing the processing complexity of the cheese. The preferred CLC inhibitor ingredient is accordingly a salt, at least one of the ions of which increases the solubility of lactate in water. The addition of CLC inhibitor of the present invention is particularly contemplated as being beneficial in natural, aged cheeses.

Sodium gluconate is the sodium salt of gluconic acid. Once sodium gluconate is incorporated into cheese during the salting step, it is believed to become solubilized in the water phase of the cheese, providing the necessary gluconate to form metastable complexes of calcium-lactate-gluconate and prevent formation of calcium lactate crystals. Other edible salts of gluconate could alternatively be used, such as potassium gluconate.

The normal range of lactate found in Cheddar cheese is 1.1 to 1.9%. Sodium gluconate added during the salting step of cheese manufacture is believed to be retained at a rate similar to the retention of salt (approximately 65-90%). Accordingly, the preferred sodium gluconate of the present invention is added in a range of about 0.32 to 4.73% sodium gluconate (depending on the lactate content of the cheese and the amount of sodium gluconate retained in the cheese) to prevent the formation of calcium lactate crystals.

Although there are numerous alternative ways gluconate could be added (i.e. addition of glucona-delta-lactone to the milk, curd, or whey; development of a gluconate producing starter or adjunct culture), the most efficient, cost effective, and readily available technique is to add sodium gluconate to the cheese during the salting step of the manufacturing process.

The calcium lactate inhibitor need be present in the cheese product during aging. If added during the salting step, most of the calcium lactate inhibitor remains in the cheese product at the time of purchase and consumption. This provides a double benefit to cheese manufacturers, in that the calcium lactate inhibitor becomes an edible part of the final cheese product. That is, the addition of the calcium lactate inhibitor results in more cheese being manufactured and sold, so the additional weight sold adds revenue for the cheese manufacturer.

Example 1

Concentrated milk was prepared by mixing 500 pounds of whole milk (3.8% butterfat) with 10 pounds of non-fat dry milk and 10 pounds of cream (40% butterfat), thereby forming concentrated milk with approximately 14.5% total solids.

The concentrated milk was then used to manufacture Cheddar cheese using a conventional milled curd method. A direct vat set, frozen, concentrated starter culture (Marschall® Superstarto concentrated cultures, Strain M30 and M42, Rhodia, Inc., Dairy Business, Madison, Wis.) was used to manufacture the cheese. A total of 36 ml of starter culture (18 ml of each strain) and 15.6 ml of color (AFC-WS-1x, Chr. Hansen, Inc., Milwaukee, Wis.) were added to the concentrated milk, which was maintained at 31° C. After a 45-minute ripening period, 24 ml of rennet (Chy-max, Chr. Hansen, Inc., Milwaukee, Wis.) diluted with 500 ml of deionized water were added to the concentrated milk. After 25-30 minutes the resultant coagulum was cut, allowed to heal for 5 minutes and then gently stirred for an additional five minutes. Subsequently the curds and whey were cooked with continuous stirring to 38° C. in 30 minutes and were then held at 38° C. for an additional 30 min. After the curds and whey reached a pH of 6.25 (30 to 45 minutes) the whey was drained and the curds were ditched and packed. The matted curd was then cut into slabs, flipped and stacked in 20-minute intervals until the curd reach a pH of 5.4. A pH of 5.4 was reached 1.5 to 2 hour after the whey was drained. The slabs of curd were then milled and approximately 60 lbs of milled curd were obtained. The 60 lbs of milled curd were then divided in half. Two separate salting treatments were then applied to each portion of the curd. One half of the milled curd (30 lbs) was salted at a rate of about 2.75% with sodium chloride (0.825 lbs). The sodium chloride was applied in three equal portions (0.275 lbs each) and the curd was mixed for 10 minutes between each sodium chloride application. The remained curd (30 lbs) was salted at a rate of about 2.75% sodium chloride (0.825 lbs) and 2.4% sodium gluconate (0.72 lbs, PMP Fermentation Products, Peoria, Ill.), such that the total sodium chloride/sodium gluconate addition was about 5.15% (1.545 lbs). The sodium chloride and sodium gluconate were applied in three equal portions (0.275 lbs and 0.24 lbs for the sodium chloride and sodium gluconate respectively) and the curd was mixed for 10 minutes between each sodium chloride/sodium gluconate application. Subsequently the curds from the control cheese with standard salting using only sodium chloride and curd with sodium chloride and sodium gluconate added were hooped and pressed overnight into two separate blocks weighing approximately 24-26 lbs.

Both cheese blocks were ripened under refrigeration for seven days. After one week of ripening the cheese from each cheese block was cut into 20-25 1 lb blocks. Each block was vacuum-sealed in clear wrapping. The vacuum-sealed cheese blocks were aged under refrigeration for two months. The pH, lactic acid content and moisture content of the control cheese was 5.13, 1.87%, and 38.84% respectively, whereas the pH, lactic acid content, gluconate content and moisture content of the sodium gluconate cheese was 5.44, 1.51%, 1.29% and 40.32% respectively. It is recognized that the maximum moisture content allowed in Cheddar cheese is 39% and that minor adjustments in the cheese making procedure for the cheese containing sodium gluconate will be required to reduce the moisture content to less than 39%.

After two months of aging, the blocks of both cheeses were inspected for the presence of calcium lactate crystals. Each of the blocks of cheese obtained from the standard salting control treatment had calcium lactate crystals visibly present on the cheese surface as well as the cheese interior. None of the blocks of cheese from the sodium gluconate treatment had any visible calcium lactate crystals present. The resultant cheese from the sodium gluconate treatment tasted smooth and smelled pleasant, with no perceptible taste, mouthfeel or odor added due to the sodium gluconate addition.

Example 2

Concentrated milk was prepared by mixing 500 pounds of whole milk (3.8% butterfat) with 10 pounds of non-fat dry milk and 10 pounds of cream (40% butterfat), thereby forming concentrated milk with approximately 14.5% total solids. The concentrated milk was then used to manufacture Cheddar cheese using a stirred curd method. A bulk starter culture was prepared by inoculating steamed reconstituted NFDM with a direct vat set, frozen, concentrated starter culture (Marschall® Superstart® concentrated cultures, Strain M46, Rhodia, Inc., Dairy Business, Madison, Wis.) and incubating overnight. The concentrated cheese milk was then inoculated with the bulk culture at a rate of 2%. Additionally 15.6 ml of color (AFC-WS-1x, Chr. Hansen, Inc., Milwaukee, Wis.) were added to the concentrated milk. The concentrated milk was then maintained at 31° C. for a 45-minute ripening period. Subsequently, 24 ml of rennet (Chy-max, Chr. Hansen, Inc., Milwaukee, Wis.) diluted with 500 ml of deionized water were added to the concentrated milk. After 25-30 minutes the resultant coagulum was cut, allowed to heal for 5 minutes and then gently stirred for an additional five minutes. Subsequently the curds and whey were cooked with continuous stirring to 38° C. in 30 minutes and were then held at 38° C. for an additional 30 min. After the curds and whey reached a pH of 6.30 (30 to 45 minutes) the whey was drained and the curds were intermittently stirred until the curd reach a pH of 5.4. A pH of 5.4 was reached 1.5 to 2 hour after the whey was drained. Approximately 60 lbs of curd were obtained and subsequently divided in half. Two separate salting treatments were then applied to each portion of the curd. One half of the curd (30 lbs) was salted at a rate of about 2.75% with sodium chloride (0.825 lbs). The sodium chloride was applied in three equal portions (0.275 lbs each) and the curd was mixed for 10 minutes between each sodium chloride application. The remained curd (30 lbs) was salted at a rate of about 2.75% sodium chloride (0.825 lbs) and 2.4% sodium gluconate (0.72 lbs, PMP Fermentation Products, Peoria, Ill.), such that the total sodium chloride/sodium gluconate addition was about 5.15% (1.545 lbs). The sodium chloride and sodium gluconate were applied in three equal portions (0.275 lbs and 0.24 lbs for the sodium chloride and sodium gluconate respectively) and the curd was mixed for 10 minutes between each sodium chloride/sodium gluconate application. Subsequently the curds from the control cheese with standard salting using only sodium chloride and curd with sodium chloride and sodium gluconate added were hooped and pressed overnight into two separate blocks weighing approximately 24-26 lbs.

Both cheese blocks were ripened under refrigeration for seven days. After one week of ripening the cheese from each cheese block was cut into 20-251 lb blocks. Each block was vacuum-sealed in clear wrapping. The vacuum-sealed cheese blocks were aged under refrigeration for two months. The pH, lactic acid content and moisture content of the control cheese was 5.35, 1.08%, and 39.0% respectively, whereas the pH, lactic acid content, gluconate content and moisture content of the sodium gluconate cheese was 5.42, 1.01%, 0.79% and 42.51% respectively. It is recognized that the maximum moisture content allowed in Cheddar cheese is 39% and that minor adjustments in the cheese making procedure for the cheese containing sodium gluconate will be required to reduce the moisture content to less than 39%.

After two months of aging, the blocks of both cheeses were inspected for the presence of calcium lactate crystals. Each of the blocks of cheese obtained from the standard salting control treatment had calcium lactate crystals visibly present on the cheese surface as well as the cheese interior. None of the blocks of cheese from the sodium gluconate treatment had any visible calcium lactate crystals present. The resultant cheese from the sodium gluconate treatment tasted smooth and smelled pleasant, with no perceptible taste, mouthfeel or odor added due to the sodium gluconate addition.

Solubility Model

Example 3

A test was run to determine the ability of ionic gluconate provided by sodium gluconate in an aqueous solution to bind with lactate over time, to thereby model the believed primary phenomenon resulting in reduced formation of calcium lactate crystal. In each sample of the model, 14.1 g of calcium lactate pentahydrate ($CH_3CHOHCOO)2 Ca.5H_2O$) was used to provide 10 g of calcium lactate (1.83 g calcium ion, 8.17 g lactate ion). Different amounts of sodium gluconate ($NaC_6H_{11}O_7$), amounts shown in Table I below) were combined with the calcium lactate pentahydrate and diluted to 100 ml with water. The samples were prepared at room temperature and each mixed well. The samples were then refrigerated at about 40° F. for 48 hours, with each sample being mixed several times during the 48 hour holding period. After the holding period, the samples were cold filtered (40° F.) and the filtrate analyzed for lactate, gluconate and calcium concentrations. The results are shown in the table below:

TABLE I

| g of $NaC_6H_{11}O_7$ added | FILTRATE RESULTS | | |
|---|---|---|---|
| | $CH_3CHOHCOO$ (%) | $C_6H_{11}O_7$ (%) | Ca (%) |
| 0 | 2.82 | — | .64 |
| 5 | 4.16 | 2.97 | .98 |
| 10 | 4.47 | 7.55 | 1.12 |
| 15 | 4.96 | 11.15 | 1.20 |
| 20 | 5.67 | 14.21 | 1.18 |
| 25 | 5.69 | 16.61 | 1.18 |

The results demonstrate that the presence of ionic gluconate does in fact increase the solubility of lactate and calcium. However, the increase in solubility plateaus when the amount of gluconate added reached about 15 g/100 ml, which is different than the calcium solubility results reported for beverage applications of sodium gluconate. These results indicate that the prevention of calcium lactate crystal formation in cheese by the addition of gluconate is not obvious or completely understood.

Solubility Model

Example 4

A control solution was prepared by adding 7.5 g of calcium L-lactate pentahydrate powder ($C(CH_3CHOHCOO)_2.5H_2O$, USP grade, FisherChemicals, Fair Lawn, N.J.—which provides 5.31 g of calcium lactate) and 0.3 g of potassium sorbate (99%, Alfa Aesart®, Shore Road, Heysham, Lancs—which prevents mold formation during storage) to a 250 ml flask. Demineralized water (60° C.) was then added to the flask to obtain a final weight of 100 g and the flask was stirred to dissolve the calcium lactate powder. Subsequently a piece of 1.5×3 cm sand paper was added to the flask to provide a nucleation site for calcium lactate crystal formation and the flask was sealed with a rubber stopper.

Experimental solutions were prepared in the same manner as the control except that 1.5% of an additive ingredient was also added to the flask. The additive ingredients for this solubility model were:
  a) sodium gluconate powder (PMP Fermentation Products, Inc., Chicago, Ill.);
  b) malic acid disodium salt ($C_4H_4O_5Na_2$; Sigma-Aldrich, Inc., St. Louis, Mo.);
  c) acetic acid sodium salt ($CH_3COONa$; Anhydrous; Sigma-Aldrich, Inc., St. Louis, Mo.);
  d) lactobionic acid ($C_{12}H_{22}O_{12}$; Sigma-Aldrich, Inc., St. Louis, Mo.); and
  e) propionic acid sodium salt ($CH_3CH_2COONa$; Sigma-Aldrich, Inc., St. Louis, Mo.).

All of the experimental solutions were adjusted to pH 6.6 using sodium hydroxide after a portion (approximately 80 ml) of the demineralized water was added and the calcium lactate had been dissolved. After preparation a sample of each solution was collected.

Subsequently all solutions were stored at 7° C. for 14 days. After 14 days the flasks were visually inspected for the presence of crystals on the sand paper and the solutions were filtered at 7° C. through filter paper (Whatman 4; Whatman International Ltd., Maidstone, England). Crystal formation was visually observed on the sand paper in the control, sodium propionate, and sodium acetate solutions, whereas no crystals were visually observed in the sodium gluconate, sodium malate, and sodium lactobionate solutions.

The supernatant and the sample collected prior to storage were analyzed for lactic acid using High Performance Liquid Chromatography (HPLC) and for calcium content by Atomic Absorption Spectroscopy (AAS), providing the results reported below in Tables II and III.

TABLE II

Calcium analysis

| Sample | Initial Concentration | After Storage | % Reduction |
|---|---|---|---|
| Control | 1.12% | .90% | 19.64% |
| 1.5% Sodium gluconate | 1.09% | 1.08% | .92% |
| 1.5% Sodium malate | 1.07% | 1.06% | .93% |
| 1.5% Sodium acetate | 1.12% | 1.00% | 10.71% |
| 1.5% Sodium lactobionate | 1.05% | 1.04% | .95% |
| 1.5% Sodium proprionate | 1.09% | .97% | 11.01% |

TABLE III

Lactate analysis

| Sample | Initial Concentration | After Storage | % Reduction |
|---|---|---|---|
| Control | 4.37% | 3.82% | 12.59% |
| 1.5% Sodium gluconate | 4.41% | 4.41% | 0.0% |
| 1.5% Sodium malate | 4.43% | 4.47% | +.92% |
| 1.5% Sodium acetate | 4.56% | 4.03% | 11.62% |
| 1.5% Sodium lactobionate | 4.33% | 4.33% | 0.0% |
| 1.5% Sodium proprionate | 4.33% | 4.06% | 6.24% |

As shown in Table II and III the solutions with sodium gluconate, sodium malate, or sodium lactobionate had a minimal (<1.0%) reduction in the calcium content and lactate content of the solution during 14 days of storage at 7° C., whereas the control, sodium propionate, and sodium acetate solutions had a reduction in the calcium content (>10%) and lactate content (>6%). Consequently, in this model system the tested sodium salts of organic acids which qualify as CLC inhibitors are sodium gluconate, sodium malate and sodium lactobionate. CLC inhibitors are effective in preventing calcium lactate crystal formation will have no or essentially no visually observable crystals and a minimal reduction (less than 5.0%, and more preferably less than 1.0%) in the calcium and lactate content of the solution after 14 days of storage at 7° C. Accordingly, sodium propionate and sodium acetate are not CLC inhibitors.

Although the present invention has been described with reference to preferred embodiments, workers skilled in the art will recognize that changes may be made in form and detail without departing from the spirit and scope of the invention.

The invention claimed is:

1. A method of making an aged, natural cheese comprising:
   developing acidity in milk and setting the milk;
   separating whey from the set milk to produce curd;
   adding an effective amount of calcium lactate crystal inhibitor to the resulting curd;
   pressing the curd into natural cheese; and
   aging the natural cheese for at least one week prior to consumption, with the calcium lactate crystal inhibitor inhibiting the growth of calcium lactate crystals during aging of the natural cheese.

2. The method of claim 1, wherein the calcium lactate crystal inhibitor is provided within a salt, and wherein the calcium lactate crystal inhibitor increases the solubility of calcium, lactate and/or calcium lactate in the water component of the natural cheese during aging.

3. The method of claim 2, wherein the salt is a sodium salt of an organic acid.

4. The method of claim 2, wherein the salt is provided in a salt mixture which comprises sodium chloride.

5. The method of claim 4, further comprising:
   measuring the salt retention of the cheese; and
   selecting the amount of calcium lactate crystal inhibitor added based the measured salt retention to result in an effective amount of calcium lactate crystal inhibitor in the salt mixture to inhibit the growth of calcium lactate crystals, such that the volume of calcium lactate crystals after two months or more aging time is reduced by at least 50% as compared to a natural cheese formed without the calcium lactate crystal inhibitor but otherwise identically formed.

6. The method of claim 1, wherein the calcium lactate crystal inhibitor is added in an amount of greater than 0 to 10% of the weight of the curd.

7. The method of claim 6, wherein the calcium lactate crystal inhibitor is added in an amount of greater than 0 to 5% of the weight of the curd, and wherein the aged, natural cheese is selected from the group consisting of:
   Cheddar cheese; and
   Colby cheese.

8. The method of claim 7, wherein the calcium lactate crystal inhibitor is added in an amount of greater than 0.32 to 4.73% of the weight of the curd.

9. The method of claim 1, wherein the aged, natural cheese comprises greater than zero to 5.8% calcium lactate crystal inhibitor.

10. The method of claim 9, wherein the aged, natural cheese comprises greater than zero to 4.5% calcium lactate crystal inhibitor, and wherein the aged, natural cheese is selected from the group consisting of:
    Cheddar cheese; and
    Colby cheese.

11. The method of claim 10, wherein the aged, natural cheese comprises about 0.26 to 2.8% calcium lactate crystal inhibitor.

12. The method of claim 1, further comprising:
    measuring the lactate content of the cheese; and
    selecting the amount of calcium lactate crystal inhibitor added based upon the measured lactate content to result in an effective amount of calcium lactate crystal inhibitor in the cheese to inhibit the growth of calcium lactate crystals, such that the volume of calcium lactate crystals after two months or more aging time is reduced by at least 50% as compared to a natural cheese formed without the calcium lactate crystal inhibitor but otherwise identically formed.

13. The method of claim 1, wherein the calcium lactate crystal inhibitor is gluconate.

14. The method of claim 1, wherein the calcium lactate crystal inhibitor is malate.

15. The method of claim 1, wherein the calcium lactate crystal inhibitor is lactobionate.

16. The method of claim 1, wherein the calcium lactate crystal inhibitor increases the solubility of lactate by at least 1 g/100 g water in the water component of the natural cheese when calcium is also present at a concentration of at least 1.06%, taken at cheese aging temperature.

* * * * *

UNITED STATES PATENT AND TRADEMARK OFFICE
CERTIFICATE OF CORRECTION

PATENT NO.       : 7,771,761 B2
APPLICATION NO.  : 11/500176
DATED            : August 10, 2010
INVENTOR(S)      : Lloyd E. Metzger et al.

It is certified that error appears in the above-identified patent and that said Letters Patent is hereby corrected as shown below:

Col. 3, line 52, delete "370° C", and insert therefor --37° C--.

Col. 7, line 4, delete "starto", and insert therefor --start®--.

Col. 9, line 60, delete "Aesart®", and insert therefor --Aesar®--.

Col. 9, line 60, delete "Lancs", and insert therefor --Lancashire--.

Signed and Sealed this

Sixteenth Day of November, 2010

David J. Kappos
*Director of the United States Patent and Trademark Office*